United States Patent
Shimomura et al.

(10) Patent No.: US 8,381,856 B2
(45) Date of Patent: Feb. 26, 2013

(54) WORKING MACHINE

(75) Inventors: Keisuke Shimomura, Hiroshima (JP);
Kouji Yonezawa, Hiroshima (JP);
Takayuki Okunishi, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 324 days.

(21) Appl. No.: 12/782,970

(22) Filed: May 19, 2010

(65) Prior Publication Data
US 2010/0294578 A1  Nov. 25, 2010

(30) Foreign Application Priority Data
May 25, 2009 (JP) .................. 2009-125361

(51) Int. Cl.
*B60K 6/20* (2007.10)
(52) U.S. Cl. ................... 180/68.5; 180/291
(58) Field of Classification Search .............. 180/291, 180/65.31, 68.1, 68.5, 900, 903, 908
See application file for complete search history.

(56) References Cited

U.S. PATENT DOCUMENTS

| | | | | |
|---|---|---|---|---|
| 4,349,078 A * | 9/1982 | Shimada et al. | ............. | 180/69.1 |
| 5,681,668 A * | 10/1997 | Reed et al. | ............. | 429/100 |
| 6,540,036 B1 * | 4/2003 | Sugano | ............. | 180/68.1 |
| 7,134,518 B2 * | 11/2006 | Arai et al. | ............. | 180/68.1 |
| 7,374,208 B2 * | 5/2008 | Yamamoto et al. | ............. | 280/834 |
| 7,388,301 B2 * | 6/2008 | Komiyama et al. | ............. | 290/40 C |
| 8,100,210 B2 * | 1/2012 | Takeuchi et al. | ............. | 180/68.5 |
| 2009/0178868 A1 * | 7/2009 | Oohashi | ............. | 180/68.5 |

FOREIGN PATENT DOCUMENTS

| | | |
|---|---|---|
| JP | 3649147 | 2/2005 |
| JP | 2007-107230 | 4/2007 |

OTHER PUBLICATIONS

U.S. Appl. No. 12/782,977, filed May 19, 2010, Shimomura, et al.
U.S. Appl. No. 12/782,952, filed May 19, 2010, Shimomura, et al.

* cited by examiner

*Primary Examiner* — John Walters
*Assistant Examiner* — Brian Swenson
(74) *Attorney, Agent, or Firm* — Oblon, Spivak, McClelland, Maier & Neustadt, L.L.P.

(57) ABSTRACT

A plurality of supports and a top plate attached to between upper ends of the supports are provided, and a power storage device and a controller are installed on the both upper and lower sides of the top plate respectively. Meanwhile, a hydraulic pump and a control valve are accommodated in space for hydraulic devices on the lower side of the top plate, and a heat insulating member and heat shield plates are provided as heat shield means for protecting the power storage device and the controller against heat from the exterior including heat of the hydraulic pump and the control valve.

7 Claims, 8 Drawing Sheets

WORKING MACHINE

BACKGROUND OF THE INVENTION

1. Field of the Invention

The present invention relates to working machines such as excavators, especially to a hybrid working machine including plural electric devices.

2. Description of the Related Art

The related art will be described taking a hybrid excavator as an example.

Figure 7:
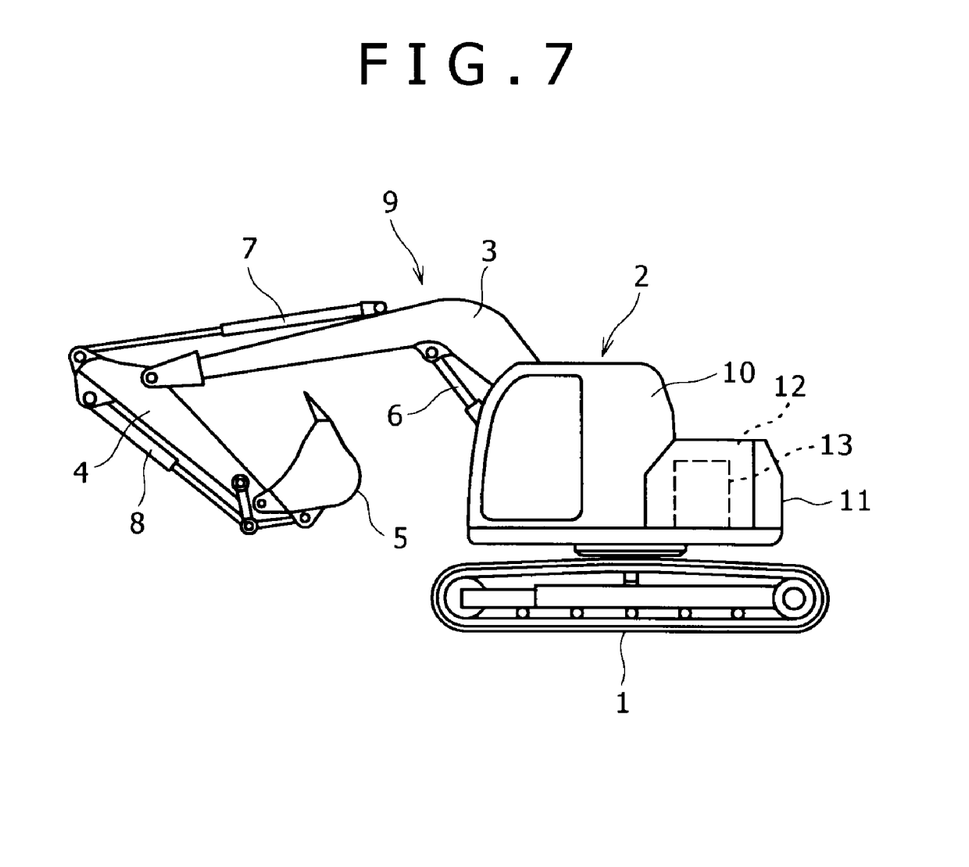
FIG. 7 is a schematic side view of an excavator to which the present invention is applied as an example.

As shown in FIG. 7, in this excavator, an upper rotating body 2 is mounted on a crawler type lower traveling body 1 rotatably around a vertical axis which is vertical to the ground. A working attachment 9 including a boom 3, an arm 4, a bucket 5 and including a boom cylinder 6, an arm cylinder 7 and a bucket cylinder 8 for, respectively, actuating the boom, the arm and the bucket is attached to a front part of this upper rotating body 2.

A cabin 10 is mounted on the left side of the front part of the upper rotating body 2, and a counterweight 11 is equipped on a rear end of the upper rotating body.

An engine room 12 is provided on a rear part of the upper rotating body 2, and an engine 13 serving as a power source is installed in this engine room 12 (refer to Japanese Patent No. 3649147 (hereinafter, referred to as Patent Document 1)).

It should be noted that in the present specification, expressions "front and rear" and "left and right" indicate the directions seen from an operator who sits in the cabin 10.

Figure 8:
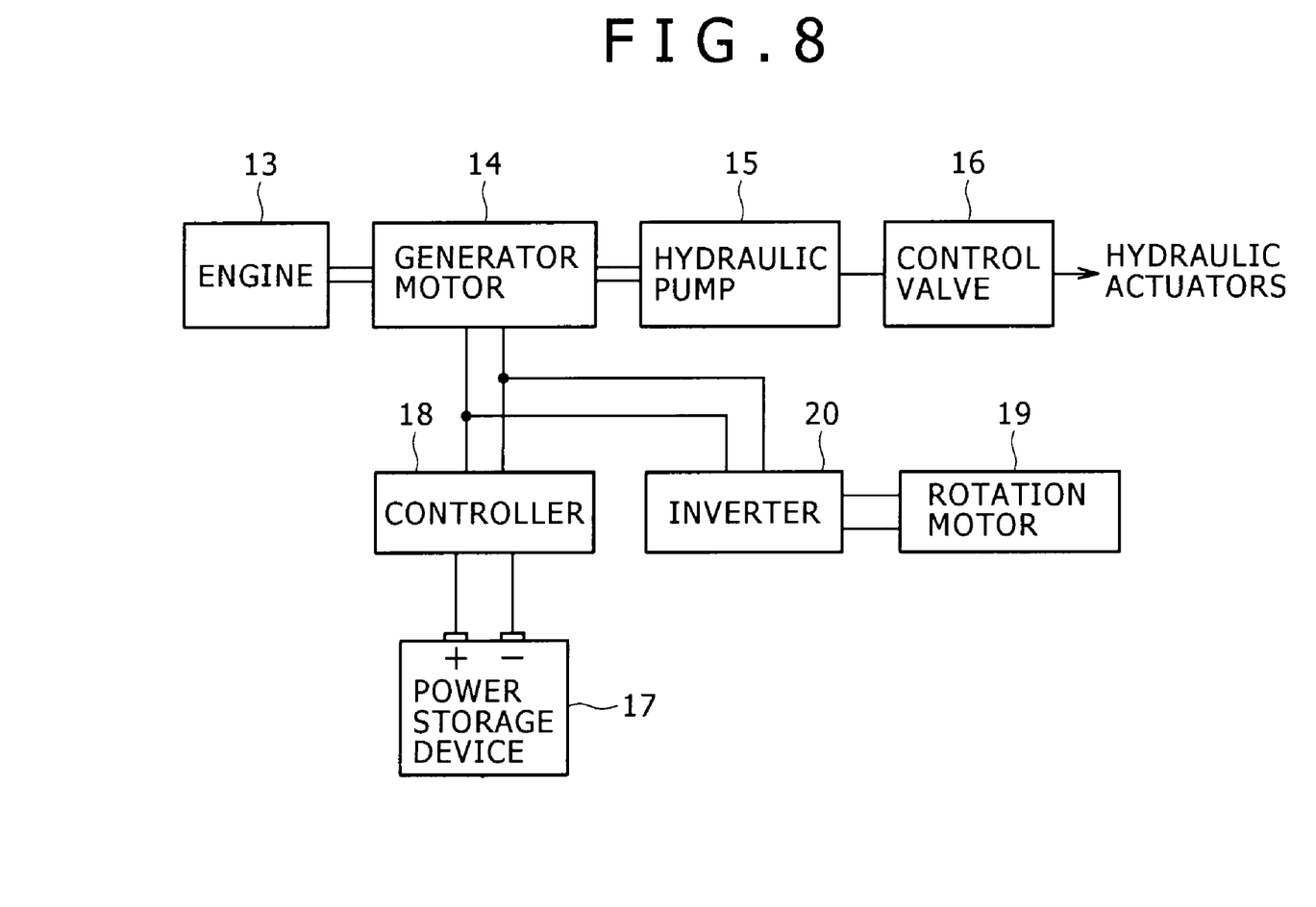
FIG. 8 is a block configuration diagram of a drive system and a control system in a case of a hybrid excavator.

FIG. 8 shows a block configuration of a drive system and a control system of this hybrid excavator.

A generator motor 14 for performing a generator operation and a motor operation and a hydraulic pump 15 are connected to the engine 13, and driven by the engine 13.

Discharge oil from the hydraulic pump 15 is supplied to hydraulic actuators such as the boom cylinder 6, the arm cylinder 7 and the bucket cylinder 8 shown in FIG. 7 and a left and right traveling hydraulic motor (not shown) through a control valve (which is the collective of plural valves each of which is provided for each of the actuators respectively) 16, so that the hydraulic actuators are driven.

Meanwhile, a power storage device (a power battery) 17 as a power source made up of a secondary battery or the like is connected to the generator motor 14 through a controller 18, and a rotation motor 19 serving as a rotation driving source is connected to the generator motor 14 through an inverter 20.

The controller 18 controls charging and discharging operations and the like of the power storage device 17 in accordance with excess and deficiency of generator output of the generator motor 14.

The inverter 20 switches the generator motor 14 between the generator operation and the motor operation, and controls generated power or an electric current as the motor or torque.

Conventionally, hybrid devices mounted in such a hybrid excavator are installed in the engine room 12 or the like as shown in Japanese Patent Laid-Open No. 2007-107230 (hereinafter, referred to as Patent Document 2).

Among the devices mounted in the hybrid excavator, the hybrid devices such as the power storage device 17 which are electric/electronic devices generating heat themselves and being sensitive to the heat (hereinafter, referred to as the devices to-be-cooled) require to be cooled down (air-cooled) for ensuring the original performance and the life thereof, and protected against the heat from the other heat generating devices (such as hydraulic devices including the hydraulic pump 15 and the control valve 16, and a muffler of an engine).

However, the known techniques shown in Patent Documents 1, 2 do not regard this point, and the device to-be-cooled and the other heat generating devices are only mixed and arranged on the same plane. Therefore, flow of the cooling air to the device to-be-cooled is basically inferior, so that a cooling effect is low and a thermal influence from the other heat generating devices is easily transmitted.

Particularly, in a case of the hybrid excavator, the hybrid devices are added to limited space of the existing machine. Thus, since the devices are concentrated on the space, the above problem is worsened. Therefore, there is a problem that the performance and the life of the device to-be-cooled are decreased.

SUMMARY OF THE INVENTION

The present invention is to provide a working machine provided with a stand by which a device to-be-cooled can be installed in an environment where the device to-be-cooled is efficiently cooled down and a thermal influence of the other heat generating devices is not easily transmitted.

A working machine of the present invention includes a stand attached to an upper frame of an upper rotating body rotatably mounted on a lower traveling body and a plurality of supports, in which a top plate on which an electric device to be cooled down is installed is attached to between upper ends of the supports, space for a hydraulic device in which the hydraulic device is accommodated is formed below the top plate, and heat shield means for protecting the electric device installed on the top plate against heat from the exterior of the device is provided.

According to the present invention, while a plurality of the devices are compactly arranged around the stand, the device to-be-cooled which generates heat itself and is sensitive to the heat (a power storage device in claim 2) can be arranged on the top plate in a state that the device to-be-cooled is placed sufficiently away from the other devices so as to be efficiently cooled down.

By the heat shield means, the device to-be-cooled can be protected against the heat from the exterior.

In the present invention, preferably, a power storage device serving as a power source for a generator motor in a hybrid working machine is installed on the top plate in the above configuration.

In this case, it is possible to ensure the original performance and the life of the device to-be-cooled (particularly, the power storage device).

In the present invention, preferably, a heat insulating member is provided on a lower surface of the top plate as the heat shield means in any of the above configurations.

In this case, when the device to-be-cooled is installed on an upper surface of the top plate, it is possible to obtain a heat insulating effect against the heat from under the top plate, that is, the heat of the hydraulic device and the like installed in the space for the hydraulic device.

In the present invention, preferably, as the heat shield means, heat shield plates for blocking heat of the hydraulic device accommodated in the space for the hydraulic device from the electric device installed on the top plate are attached to between the supports so as to surround the space for the hydraulic device in any of the above configurations.

In this case, by the heat shield plates attached to between the supports, it is possible to prevent situations that the heat from the hydraulic device is escaped to the outer peripheral side of the stand and transferred to the device to-be-cooled on the top plate, and that the heat in the exterior of the stand (or in a muffler for example) invades the space for the hydraulic device.

Alternatively, since the heat shield plates are attached to between the supports so as to surround the space for the hydraulic device, it is possible to obtain a heat shield effect for electric devices installed around the stand other than the power storage device.

In the present invention, preferably, a ventilation port for distributing cooling air between the upper side and the lower side of the top plate is provided in the top plate in any of the above configurations.

In this case, when devices to-be-cooled are installed and air-cooled on the both upper and lower sides of the top plate, it is possible to cool down the both devices by a common cooling structure with the ventilation port provided in the top plate.

DESCRIPTION OF THE PREFERRED EMBODIMENTS

An embodiment of the present invention will be described with FIGS. 1 to 6.

In the embodiment, the present invention is applied to a hybrid excavator shown in FIGS. 7 and 8.

It should be noted that in the embodiment, among the members and devices to be equipped or mounted in the hybrid excavator, the same ones as in FIGS. 7 and 8 are given the same reference numerals.

Figure 1:
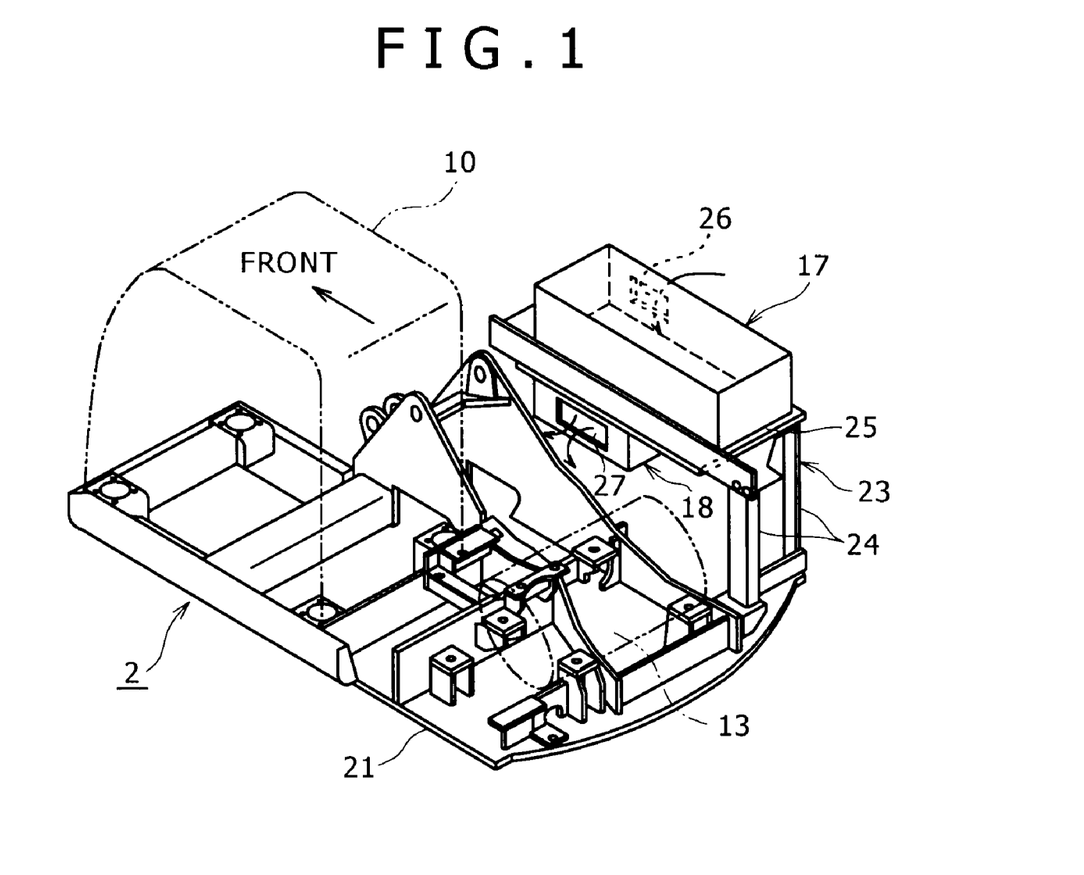
FIG. 1 is a perspective view of an upper frame of an upper rotating body in a hybrid excavator in an embodiment of the present invention.
Figure 2:
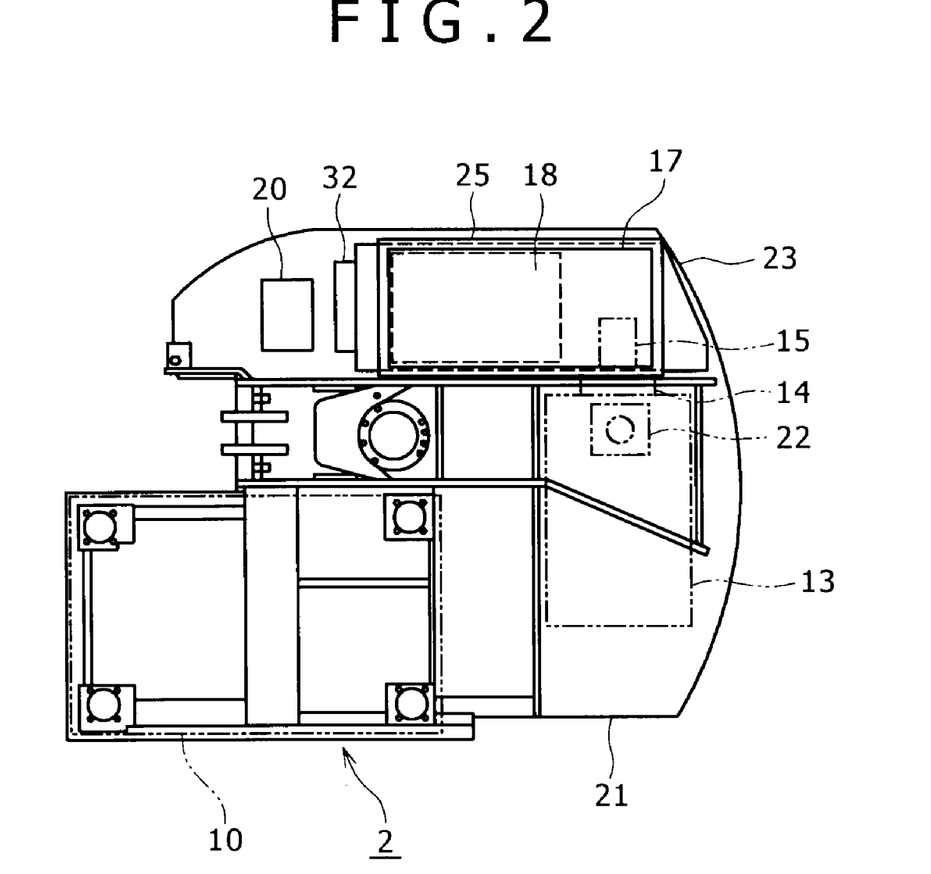
FIG. 2 is a side view of the upper frame.
Figure 3:
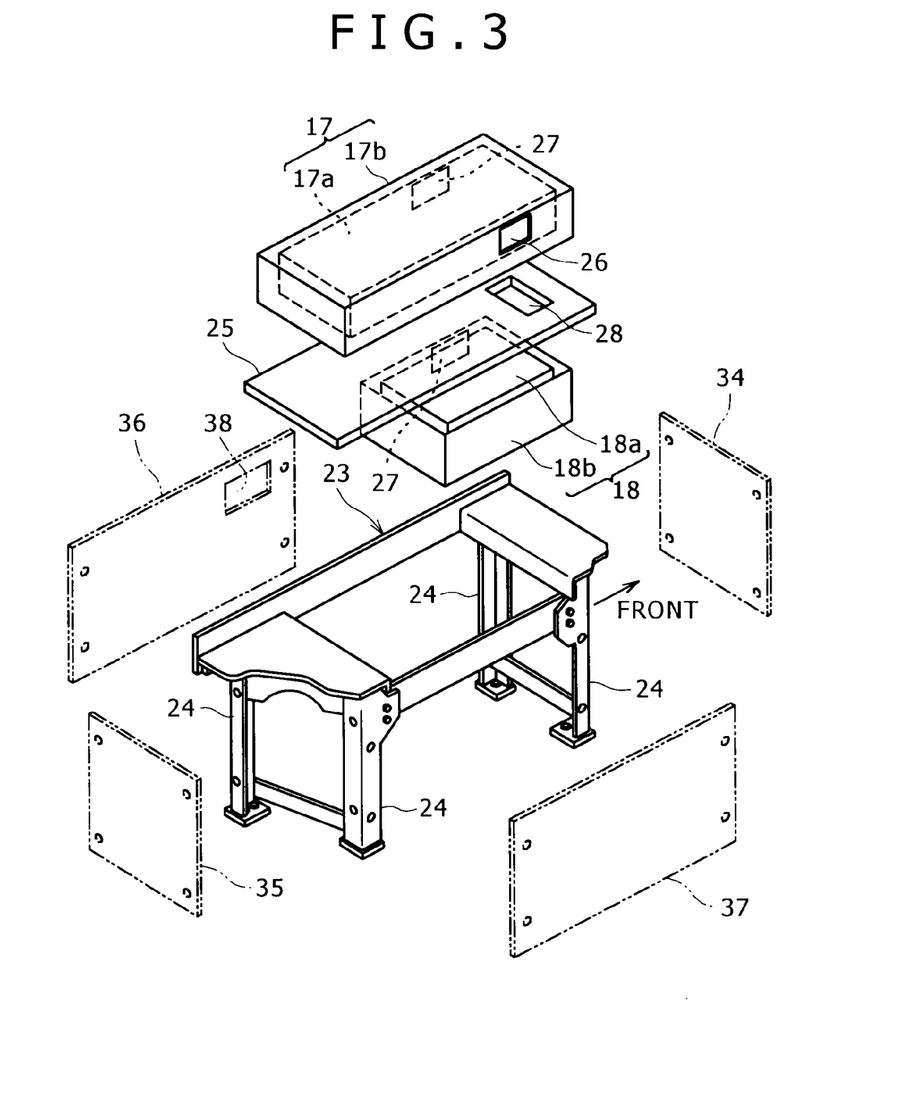
FIG. 3 is an exploded perspective view of a stand provided on the upper frame, and a power storage device and a controller to be built into the stand.
Figure 4:
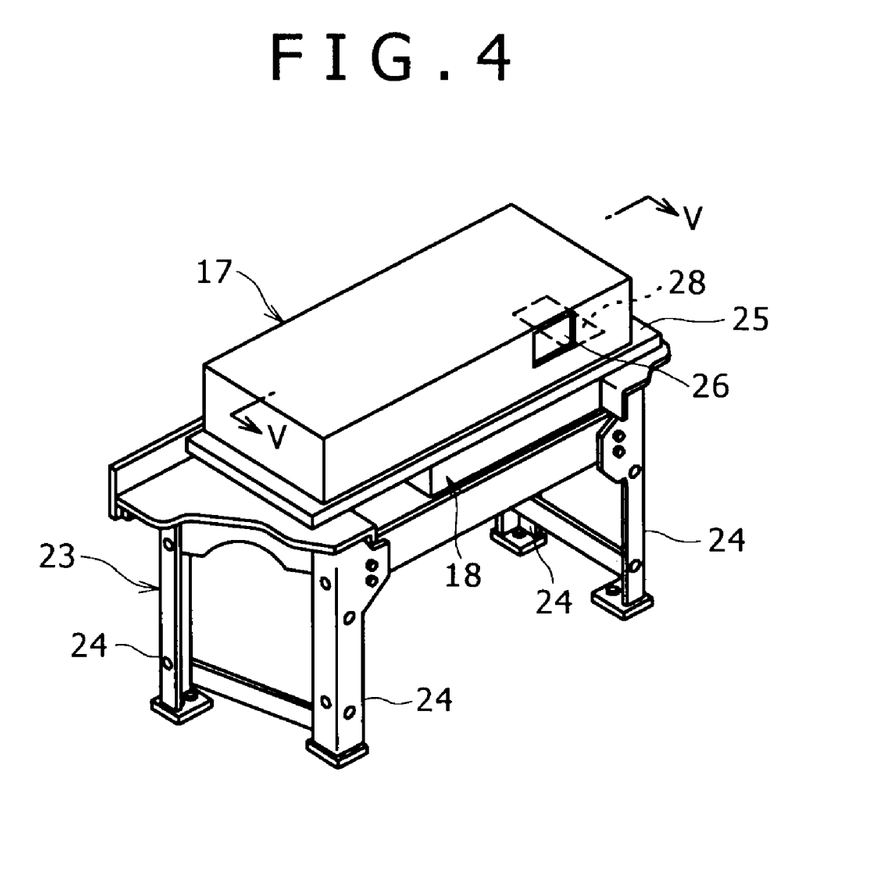
FIG. 4 is a perspective view of a state that the power storage device and the controller are built into the stand.

In FIGS. 1, 2, the reference numeral 21 denotes an upper frame constituting an upper rotating body 2. A working attachment 9 in FIG. 7 is equipped on a substantial center of a front part of this upper frame 21. A cabin 10 is mounted on the left side of the front part of the upper frame 21. An engine 13 is mounted on a rear part of the upper frame 21. A generator motor 14 and a hydraulic pump 15 are connected to the engine 13. In FIG. 2, the reference numeral 22 denotes a muffler of the engine 13.

A stand 23 according to this embodiment is attached to the rear part of the upper frame 21 on a right side deck (on the diagonally rearward right seen from an operator in the cabin 10). A plurality of devices including hybrid devices such as a power storage device 17 is built into this stand 23.

This point will be described in detail.

As shown in FIGS. 3 to 6 in detail, the stand 23 serves as a self-standing and assembling type of independent stand which is formed by combining four front, rear, left and right supports 24 (the supports may be five or more) with plural beam members by means of bolts and attaching a top plate 25 between upper ends of the supports 24.

Figure 5:
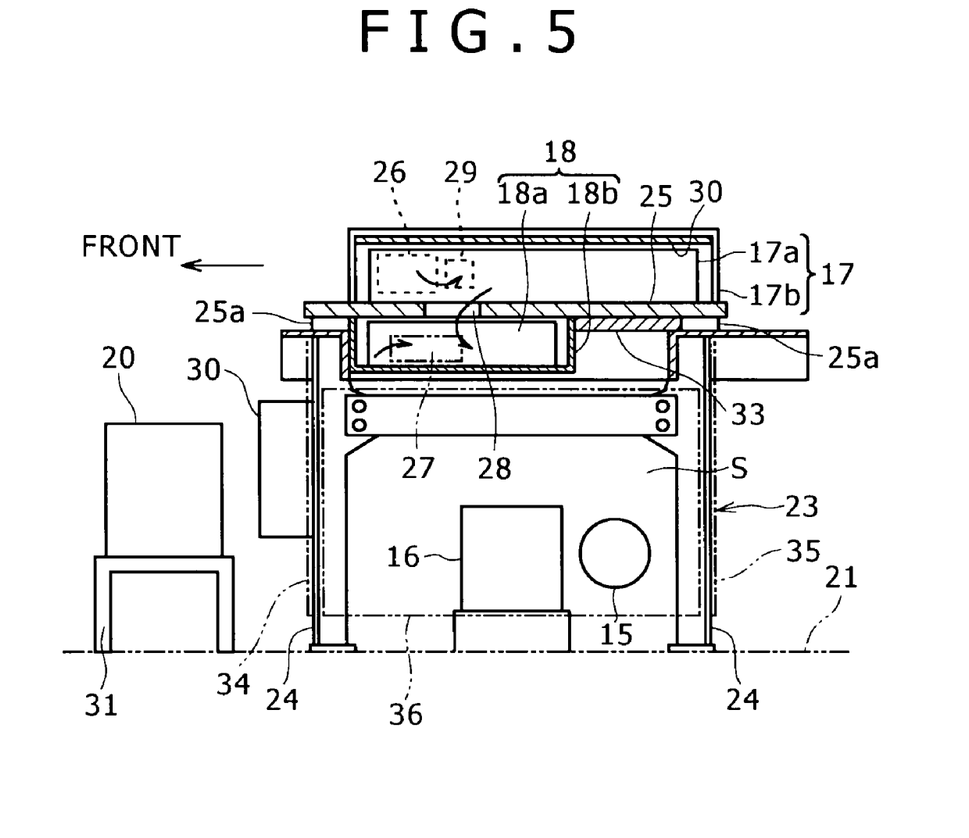
FIG. 5 is a sectional view taken from line V-V of FIG. 4.
Figure 6:
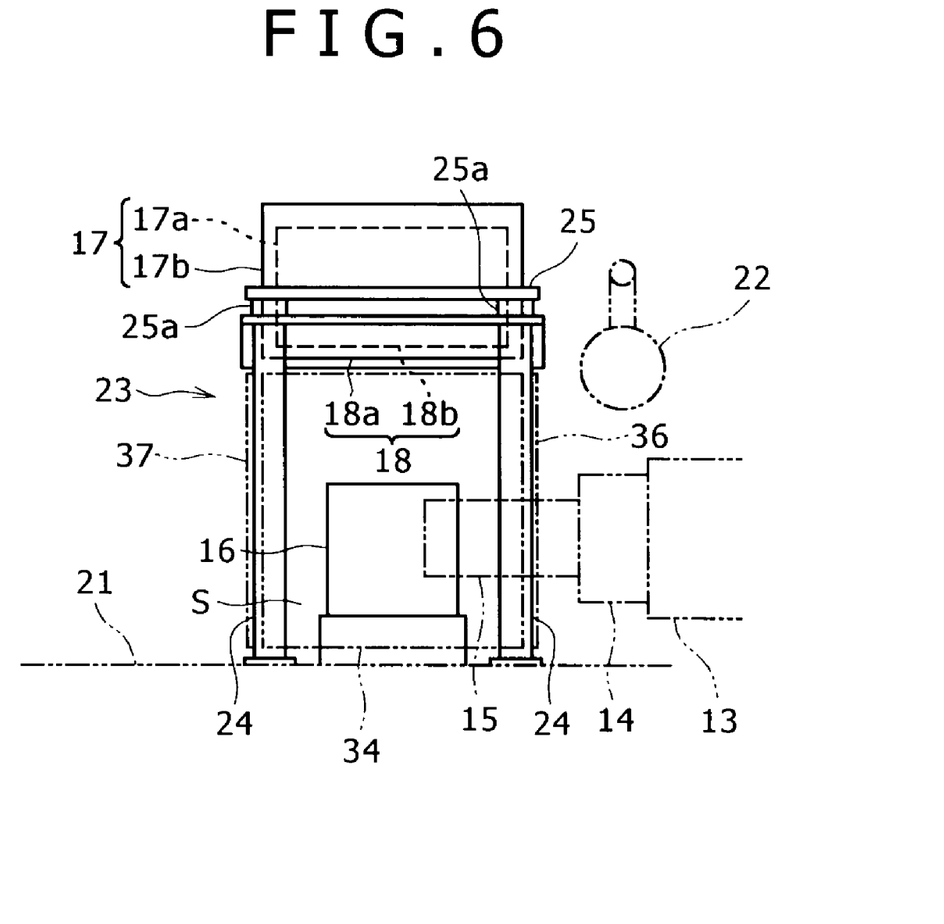
FIG. 6 is a front view of a state of FIG. 4.

This stand 23 is attached to the upper frame 21 detachably at lower ends of the supports 24 in a state that the hydraulic pump 15 and a control valve 16 are accommodated in space (space for the hydraulic devices) S below the top plate (the stand 23 is over the hydraulic pump 15 and the control valve 16) as shown in FIGS. 5, 6. The power storage device 17 is installed on the upper surface side of the top plate 25, and the controller 18 is installed on the lower surface side.

In other words, a shape, size, strength and the like of the entire stand including the top plate 25 are set so that the power storage device 17 and the controller 18 can be installed on the upper and lower sides of the top plate.

Thus, the power storage device 17 and the controller 18 which are devices to-be-cooled which generate heat themselves and are sensitive to the heat, are arranged so as to overlap each other in the up and down direction in a state that the top plate 25 is placed between the power storage device and the controller. Particularly, the power storage device 17 on the upper side whose performance and life depend on the heat is set at the highest position among all the devices mounted in the upper rotating body 2.

The power storage device 17 and the controller 18 are each made up of a main body 17a or 18a and casing 17b or 18b covering the main body, and attached to the top plate 25 so that the main bodies face each other relative to the top plate 25.

The casing 17b of the power storage device is formed into a box with an open lower surface, and the casing 18b of the controller is formed into a box with an open upper surface. The casing 17b of the power storage device is installed on the top plate 25 through vibration-proof mounts 25a (refer to FIGS. 5, 6).

An intake port 26 is provided on a right side surface of the casing 17b of the power storage device 17, and an exhaust port 27 is provided on a left side surface of the casing 18b of the controller 18. A ventilation port 28 providing communication between the casings 17b, 18b is provided at a position on the top plate 25 where the both devices overlap each other.

In the drawings, the intake port 26 and the exhaust port 27 are shown as simple openings. However, wire sheets or filters (not shown) for preventing invasion of foreign substances are actually provided in them.

A suction fan 29 is provided in the casing 17b of the power storage device 17.

According to this structure, the external air (the cooling air) is introduced into the power storage device 17 (the casing 17b) by the suction fan 29, fed through between the main body 17a of the power storage device and the casing 17b, and fed into the controller 18 (the casing 18b) from the ventilation port 28 as shown by arrows in FIGS. 1, 5.

Then, the external air is fed through between the main body 18a of the controller and the casing 18b as similarly as the power storage device 17, and exhausted from the exhaust port 27 to the exterior.

It should be noted that a converter 30 for normally controlling the battery is attached to a front surface of the stand 23, and an inverter 20 is installed in front of the stand on the upper frame 21 through another stand 31.

Meanwhile, heat shield means for protecting, against the heat from the exterior, devices to-be-cooled (the power storage device 17 and the controller 18) installed on the top plate 25, especially the power storage device 17 which is particularly sensitive to the heat, is provided on the stand 23.

That is, firstly, as shown in FIG. 5, a heat insulating member 32 for protecting the power storage device 17 against solar heat is provided on the inner side of an upper surface of the casing 17b, and a heat insulating member 33 for blocking the heat from the hydraulic pump 15 and the control valve 16 accommodated in the space S for hydraulic devices is provided on a lower surface of the top plate.

It should be noted that as means for protecting the main body 17a of the power storage device against the solar heat, the upper surface of the casing 17b may be formed into a double layer structure including outer and inner plates so as to form an air layer, and a large number of escape holes for releasing the heat enclosed in this air layer to the exterior may be provided on a peripheral surface of the casing. In this case, the heat insulating member 32 is not necessarily provided, or may be provided on the lower side of the air layer so as to form a double heat insulating structure.

Secondly, heat shield plates 34 to 37 are attached to front, rear left and right side surfaces (between the supports) of the stand 23 so as to surround the space S for the hydraulic devices.

These heat shield plates 34 to 37 prevent situations that the heat from the hydraulic devices (the hydraulic pump 15, the control valve 16) is transferred through the outer peripheral side of the stand to the power storage device 17 on the top plate 25 or radiated onto electric devices installed around the stand 23 other than the power storage device 17 (such as an inverter 20 installed on the front side of the stand), and that the heat of the engine room including the heat from the muffler 22 invades the space S for the hydraulic devices of the stand 23.

The heat shield plates 34 to 37 may be simple metal plates such as iron plates or formed by adhering heat insulating members or heat shield members onto the metal plates.

It should be noted that the left heat shield plate 36 is provided so as to cover the left side surface of the casing 18b of the controller in which the exhaust port 27 is provided. Therefore, an opening 38 (refer to FIG. 3) for releasing the air after cooling exhausted from the exhaust port 27 to the exterior is provided in the heat shield plate 36.

In such a way, while a plurality of the devices are compactly arranged around the stand 23, the power storage device 17 and the controller 18 which are devices to-be-cooled which generate heat themselves and are sensitive to the heat, can be arranged on the top plate 25 which is more ventilated than other positions in a state that the devices 17, 18 can be placed sufficiently away from the other devices so as to be efficiently cooled down.

Particularly, since the power storage device 17 whose performance and life depend on the heat is installed on an upper surface of the top plate which is the best ventilated, it is possible to efficiently cool down the power storage device 17.

By the heat insulating members 32, 33 and the heat shield plates 34 to 37, it is possible to protect the power storage device 17 against the solar heat and the heat from the exterior such as the hydraulic devices installed in the space S for the hydraulic devices (the hydraulic pump 15 and the control valve 16) and the muffler 22 placed on the left side of a rear part of the stand.

That is, since the cooling efficiency is fine and a heat shield effect is obtained, it is possible to maintain a favorable environment for installing the power storage device 17.

The heat shield plates 34 to 37 are attached between the supports so as to surround the space S for the hydraulic devices. Therefore, it is possible to protect not only the power storage device 17 but also the other electric devices installed around the stand (the inverter 20 in the embodiment) against the heat from the hydraulic devices.

In addition, the following effects can be obtained according to the embodiment.

(i) The power storage device 17 is installed at the highest position among all the devices mounted on the upper rotating body 2, that is, at the best ventilated position without any obstacles in a circumference thereof. In other words, the stand 23 is formed and attached to the upper frame 21 so that the power storage device 17 is placed at the highest position. Therefore, it is possible to facilitate contact between the power storage device 17 and the cooling air so as to further increase the cooling efficiency.

According to this arrangement, there are no obstacles to maintenance in the circumference, so that sufficient maintenance space can be ensured. Therefore, the maintenance for the power storage device 17 is easily performed.

(ii) The cooling air is introduced into the casing 17b of the power storage device 17 and brought into direct contact with the main body 17a of the power storage device, and the suction fan 29 offers forcible air intake and exhaust. Therefore, it is possible to more efficiently cool down the power storage device 17.

(iii) By utilizing the lower surface of the top plate 25 of the stand, the space S for the hydraulic devices, and the supports 24 of the stand, it is possible to compactly build in the other devices (the controller 18, the converter 30, the hydraulic pump 15, the control valve 16) in a state that cooling performance and a maintenance property of the power storage device 17 are not deteriorated.

Consequently utilization efficiency for space can be increased. Therefore, device layout is easily determined. Alternatively, device occupancy space can be reduced so as to decrease a rotation radius of a rear end of the machine.

(iv) Since the power storage device 17 and the controller 18 are arranged on the upper side and lower side of the top plate 25 of the stand respectively, and the ventilation port 28 is provided in the top plate 25, both the devices 17, 18 are cooled down by the common cooling structure. Therefore, the present invention is advantageous in terms of cost and space.

(v) Since the power storage device 17 and the controller 18 which are often inspected at the same time are arranged in the up and down direction, it is possible to arrange the both devices 17, 18 close to each other within limited space. Therefore, the maintenance is more easily performed.

(vi) It is possible to utilize the ventilation port 28 as a distribution hole for a wire connecting the both devices 17, 18. Therefore, wiring is easily performed with the shortest length.

OTHER EMBODIMENTS (1) The suction fan 29 may be provided in the vicinity of the ventilation port 28 or the exhaust port 27 of the casing 18b of the controller.

Alternatively, a push-in fan may be used instead of the suction fan 29. Further, such a fan is not necessarily provided, so that the air is suctioned and exhausted by a natural convection current. It this case, there is a possibility that the intake port 26 in the above embodiment functions as an exhaust port and the exhaust port 27 functions as an intake port according to circumstances.

(2) Separate cooling structures for the power storage device 17 and the controller 18 may be provided respectively for independently cooling down the both devices.

In this case, the exhaust port of the power storage device 17 may be provided in the casing 17b (a side surface or the like) of the power storage device, for example.

(3) In the above embodiment, the power storage device 17 is installed on the upper side of the top plate 25 of the stand, and the controller 18 is installed on the lower side. However, conversely, the controller 18 may be installed on the upper side of the top plate, and the power storage device 17 may be installed on the lower side. Alternatively, the other devices to-be-cooled may be installed on the both upper and lower sides or one side of the top plate 25.

(4) The present invention is particularly suitable for a hybrid working machine, since the hybrid working machine has a large number of the devices to-be-cooled including the power storage device 17. However, the present invention is applicable to a hydraulic working machine provided with devices to-be-cooled such as a hydraulic excavator.

Although the invention has been described with reference to the preferred embodiments in the attached figures, it is noted that equivalents may be employed and substitutions made herein without departing from the scope of the invention as recited in the claims.

What is claimed is:

1. A working machine, comprising:
   a lower traveling body;
   an upper rotating body rotatably mounted on said lower traveling body, said upper rotating body having an upper frame;
   a hydraulic device provided on the upper frame;
   an electric device to be cooled down; and
   a stand attached to the upper frame of said upper rotating body, said stand including
   a plurality of supports each extending in a vertical direction,
   a top plate attached to respective upper ends of said plurality of supports, said electric device being installed on said top plate, said plurality of supports and said top plate defining a space and the hydraulic device being accommodated in the space under said top plate, and
   heat shield means for protecting the electric device installed on said top plate against heat from said hydraulic device accommodated in the space.

2. The working machine according to claim 1, wherein
   the working machine is a hybrid working machine for which engine power and electric power are used in combination, and
   a power storage device serving as a power source for a generator motor in the hybrid working machine is installed on said top plate.

3. The working machine according to claim 1, wherein said heat shield means includes a heat insulating member between a lower surface of said top plate and said hydraulic device accommodated in the space.

4. The working machine according to claim 1, wherein said heat shield means includes heat shield plates attached on said supports so as to enclose the space for blocking heat of the hydraulic device accommodated in the space from the electric device installed on said top plate.

5. The working machine according to claim 1, wherein said top plate includes a ventilation port therethrough for distributing cooling air from the upper side to the lower side of said top plate.

6. The working machine according to claim 1, wherein each support of the plurality of supports is adjoined to another support via a beam member.

7. The working machine according to claim 4, wherein the heat shield plates extend between adjacent supports.

* * * * *